United States Patent
Zoppas et al.

(10) Patent No.: US 11,571,846 B2
(45) Date of Patent: Feb. 7, 2023

(54) BLOW MOULD

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Matteo Zoppas, Conegliano (IT); Cristiano Galimberti, Sernaglia della Battaglia (IT); Carlo Corocher, Conegliano (IT); Catalin Negrescu, Timisoara (RO); Andrea Mariani, Conegliano (IT); Luigino Bischer, Conegliano (IT)

(*) Notice: Subject to any disclaimer, the term of this patent is extended or adjusted under 35 U.S.C. 154(b) by 707 days.

(21) Appl. No.: 16/076,769

(22) PCT Filed: Feb. 17, 2017

(86) PCT No.: PCT/IB2017/050897
§ 371 (c)(1),
(2) Date: Aug. 9, 2018

(87) PCT Pub. No.: WO2017/141196
PCT Pub. Date: Aug. 24, 2017

(65) Prior Publication Data
US 2019/0047204 A1    Feb. 14, 2019

(30) Foreign Application Priority Data
Feb. 19, 2016 (IT) .................. 102016000017532

(51) Int. Cl.
*B29C 49/48* (2006.01)
*B29C 49/06* (2006.01)
(Continued)

(52) U.S. Cl.
CPC .......... *B29C 49/4823* (2013.01); *B29C 49/48* (2013.01); *B29C 49/06* (2013.01);
(Continued)

(58) Field of Classification Search
CPC ..... B29C 49/48; B29C 49/06; B29C 49/4823; B29C 2049/4856; B29C 2049/4858;
(Continued)

(56) References Cited

U.S. PATENT DOCUMENTS

| | | | | |
|---|---|---|---|---|
| 6,390,802 B1 * | 5/2002 | Zoppas | .................... | B29C 49/36 425/451.5 |
| 6,824,731 B1 * | 11/2004 | Zoppas | ............... | B29C 49/4205 264/523 |
| 8,807,981 B2 * | 8/2014 | Cirette | .................... | B29C 49/38 425/195 |

(Continued)

FOREIGN PATENT DOCUMENTS

EP   2554357 A1   2/2013

OTHER PUBLICATIONS

International Search Report and Written Opinion dated Nov. 5, 2017 for corresponding International Patent Application No. PCT/IB2017/050897.

*Primary Examiner* — Seyed Masoud Malekzadeh
(74) *Attorney, Agent, or Firm* — Abelman, Frayne & Schwab; Stefan Knirr

(57) ABSTRACT

A blow mold provided with a locking system for mutually locking each half-mold with the related half-mold holder, thus allowing a simpler and quicker replacement of the side half-impressions of the mold. The blow mold of the invention provides for the side half-impression of each half-mold to be fixed in a cavity of the corresponding mold holder by actuating at least one quick coupling device comprising a bar (23) inserted in one of the two longitudinal edges of the half-mold holder (3) and adapted to move only by rotation (Continued)

about an axis thereof; actuation means (22) adapted to actuate a rotation of said bar; and at least one locking fin (21) fixed along said bar (23) and adapted to move, by rotating the bar (23), from an unlocking position to a locking position in which said locking fin interacts with the respective half-mold (2).

14 Claims, 12 Drawing Sheets

(51) Int. Cl.
  *B29L 31/00* (2006.01)
  *B29K 67/00* (2006.01)
(52) U.S. Cl.
  CPC ............ *B29C 2049/4856* (2013.01); *B29C 2049/4858* (2013.01); *B29C 2049/4864* (2013.01); *B29C 2049/4892* (2013.01); *B29K 2067/003* (2013.01); *B29L 2031/7158* (2013.01)
(58) Field of Classification Search
  CPC .... B29C 2049/4864; B29C 2049/4892; B29C 2049/4866
  See application file for complete search history.

(56) References Cited

U.S. PATENT DOCUMENTS

| | | | |
|---|---|---|---|
| 2007/0212442 A1* | 9/2007 | Nonogaki | B29C 49/48 425/541 |
| 2009/0136613 A1* | 5/2009 | Linke | B29C 33/305 425/541 |
| 2009/0263535 A1* | 10/2009 | Tonga | B29C 33/30 425/522 |
| 2011/0052743 A1 | 3/2011 | Langlois | |
| 2011/0057342 A1* | 3/2011 | Meinzinger | B23H 7/08 264/39 |
| 2012/0034331 A1* | 2/2012 | Dorrman | B29C 33/306 425/538 |
| 2012/0135101 A1* | 5/2012 | Blanchard | B29C 49/48 425/522 |
| 2012/0148703 A1 | 6/2012 | Duclos | |
| 2012/0164263 A1* | 6/2012 | Pasquier | B29C 49/48 425/541 |
| 2013/0193624 A1* | 8/2013 | Blochmann | B29C 49/42 264/523 |
| 2013/0337099 A1* | 12/2013 | Cirette | B29C 49/42 425/161 |
| 2014/0017353 A1* | 1/2014 | Zoppas | B29C 33/305 425/541 |
| 2015/0343696 A1 | 12/2015 | Geltinger | |
| 2018/0104885 A1* | 4/2018 | Alix | B29C 49/063 |

\* cited by examiner

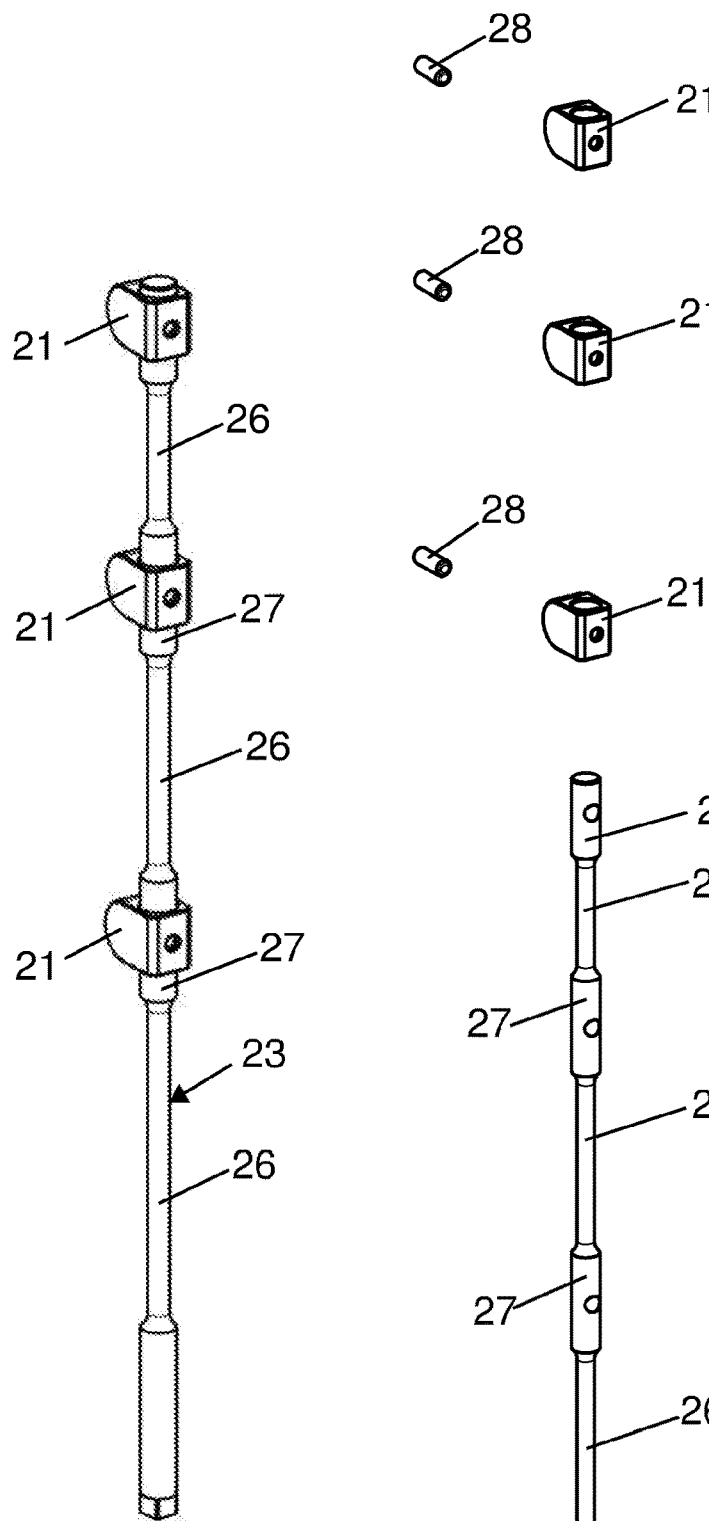
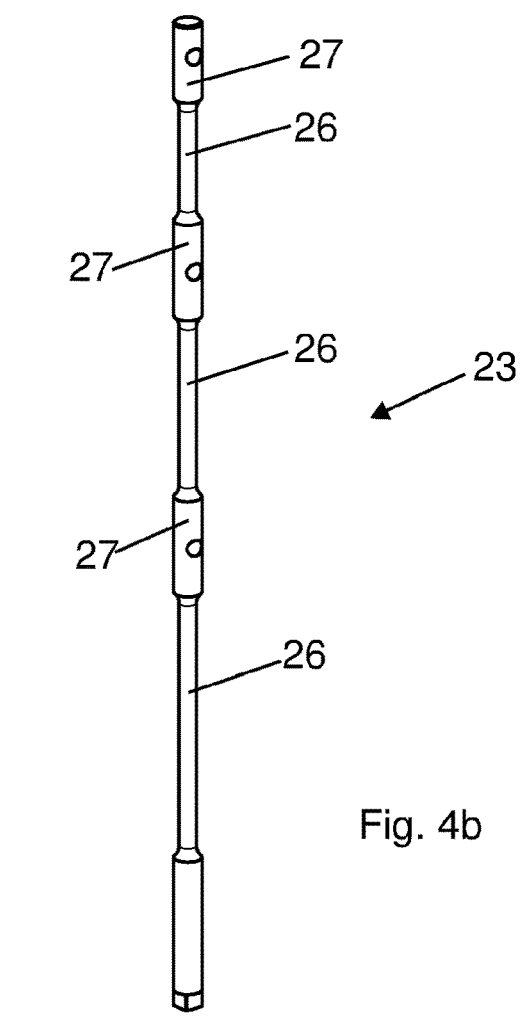
Fig. 4a
Fig. 4b

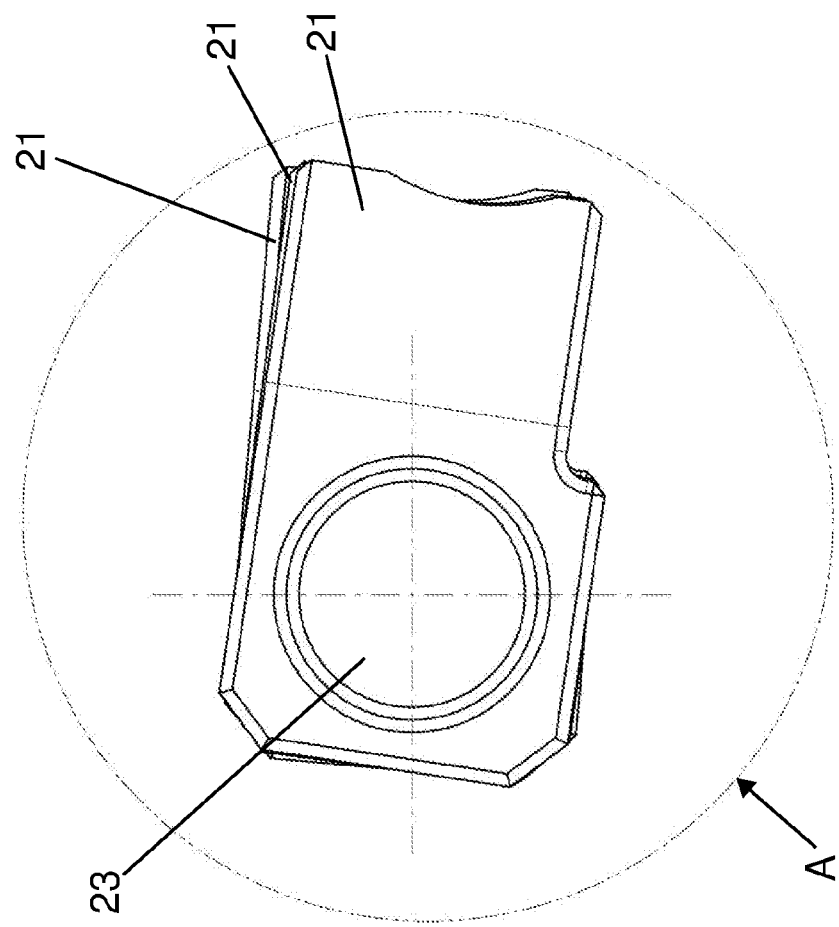
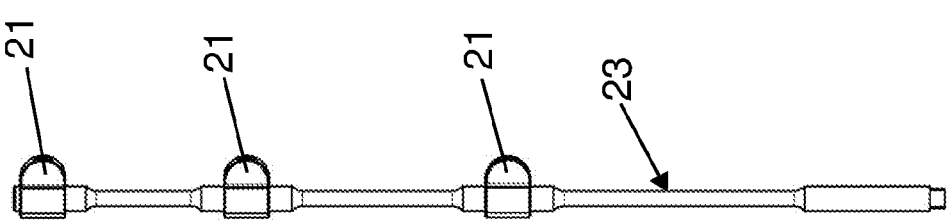
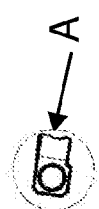

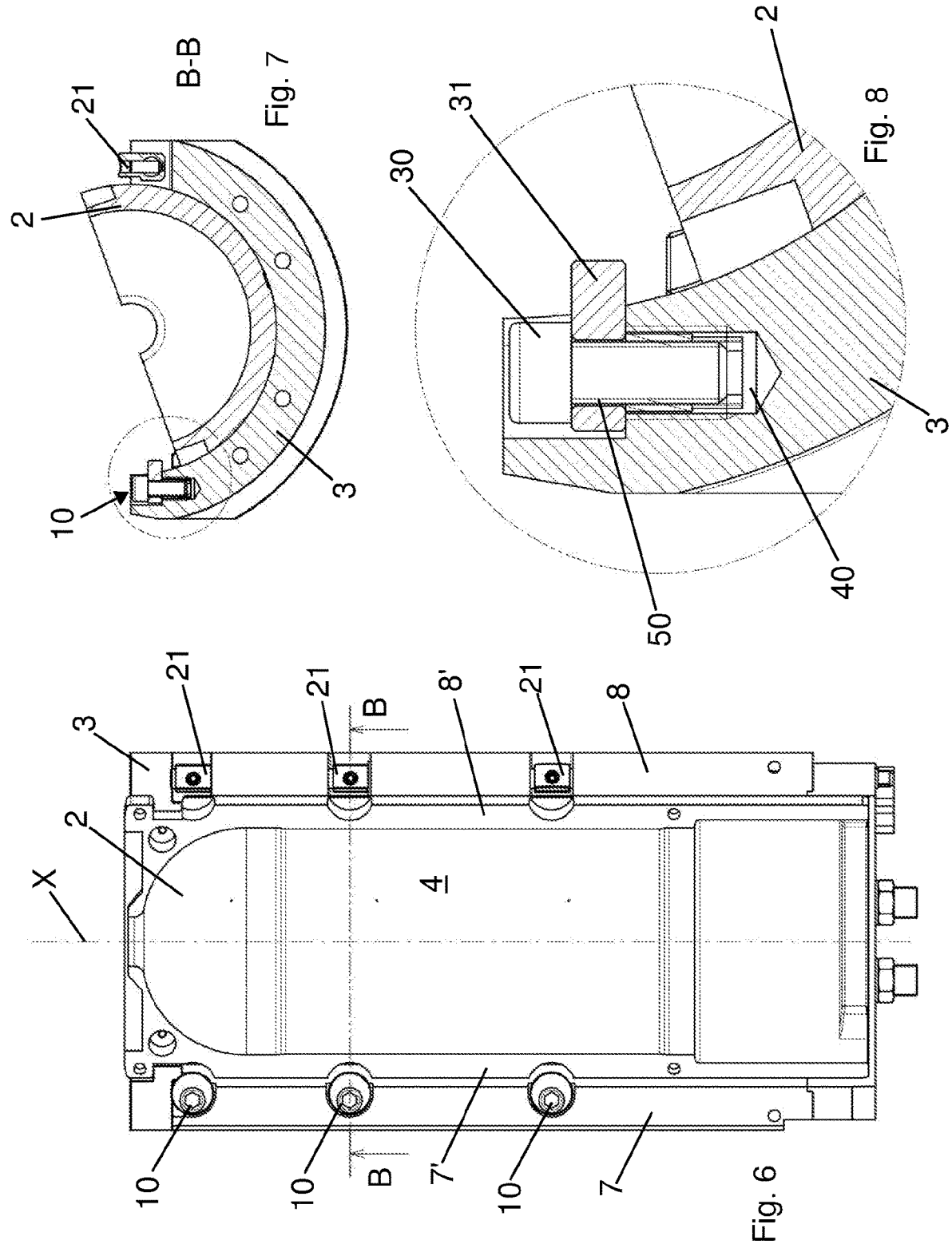

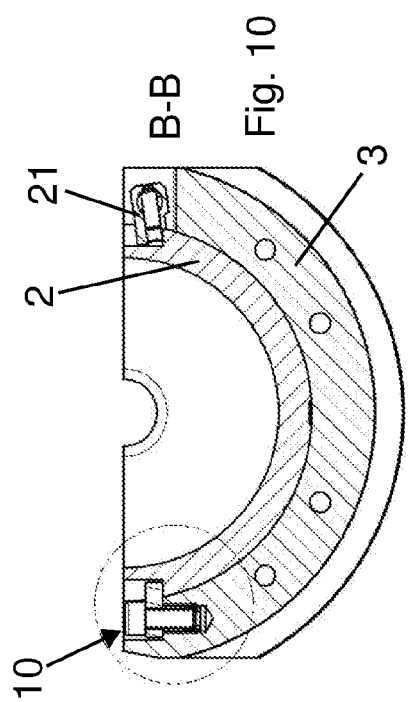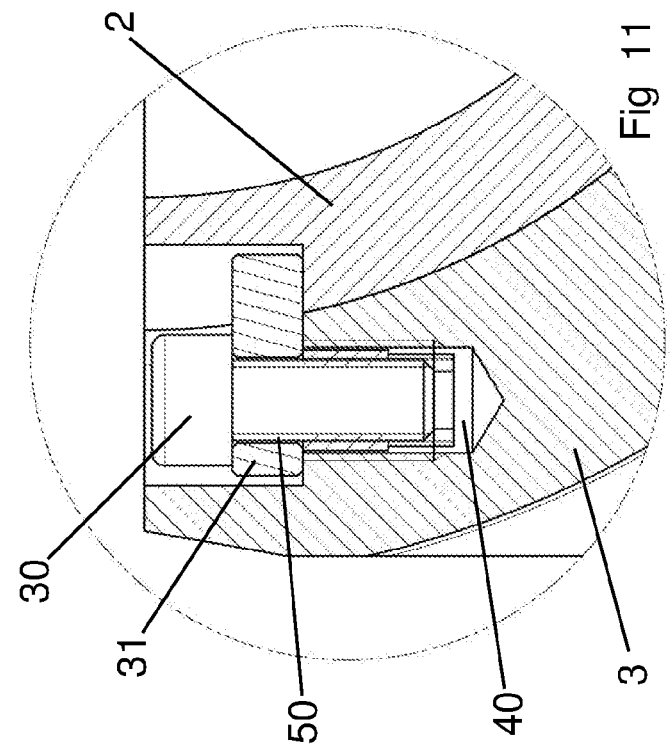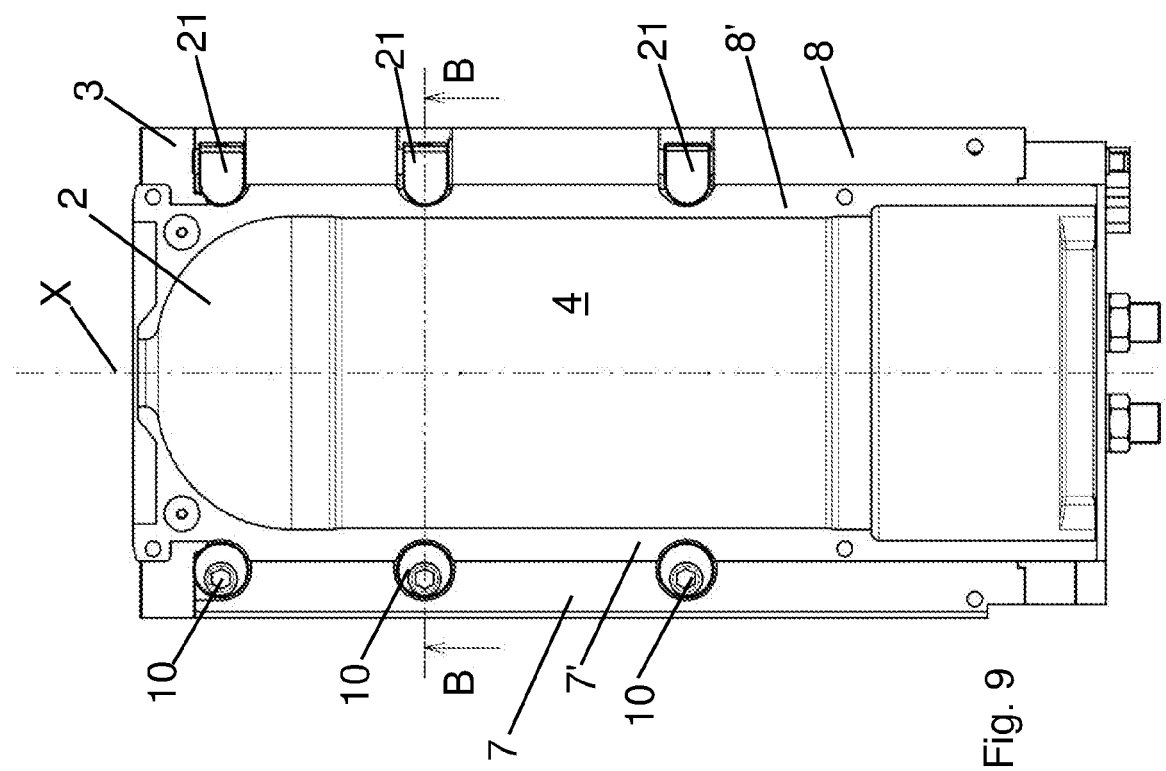

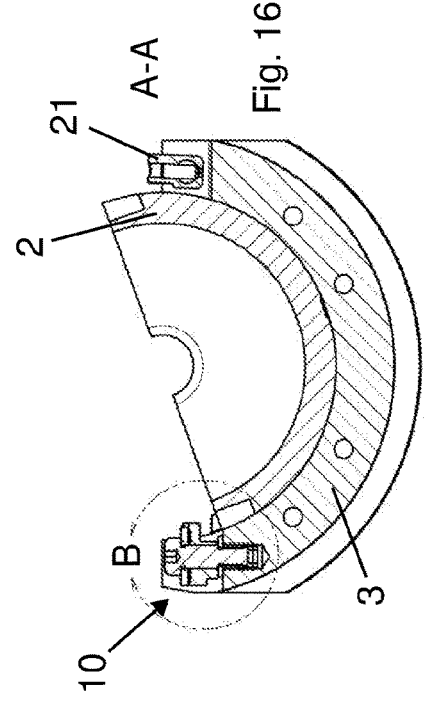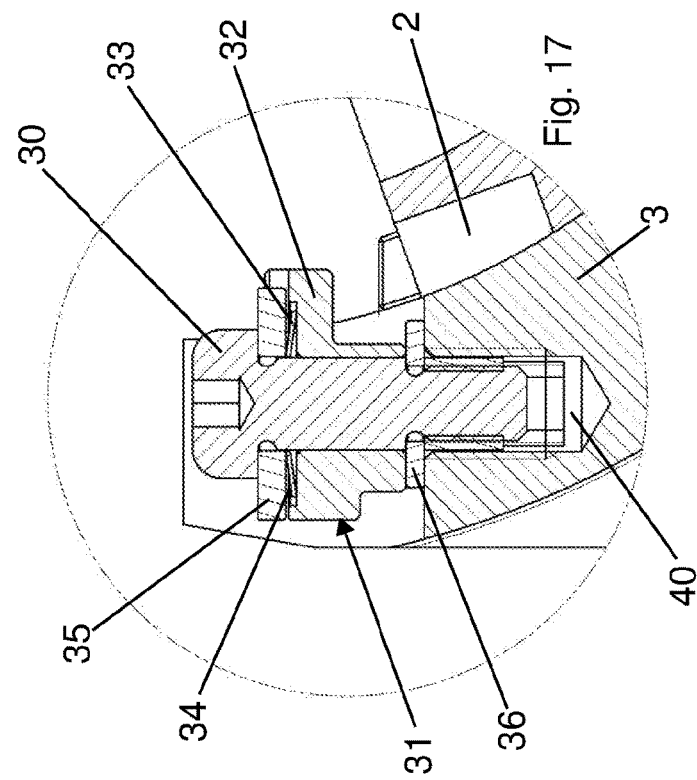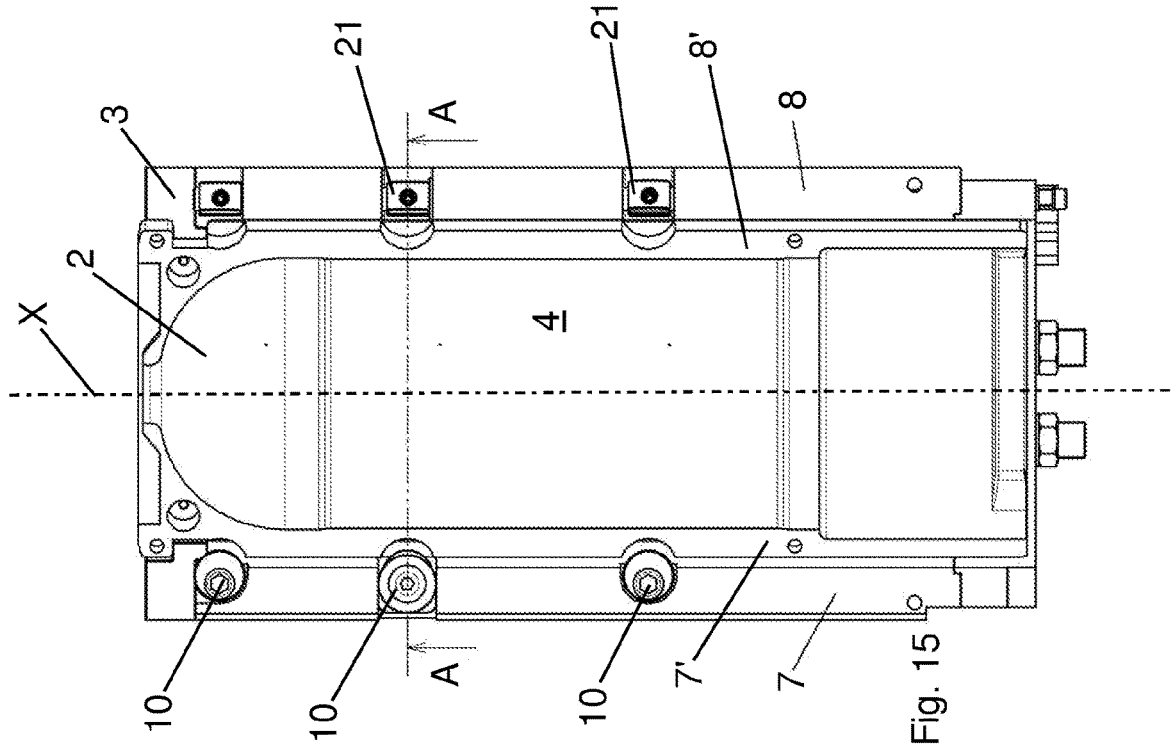

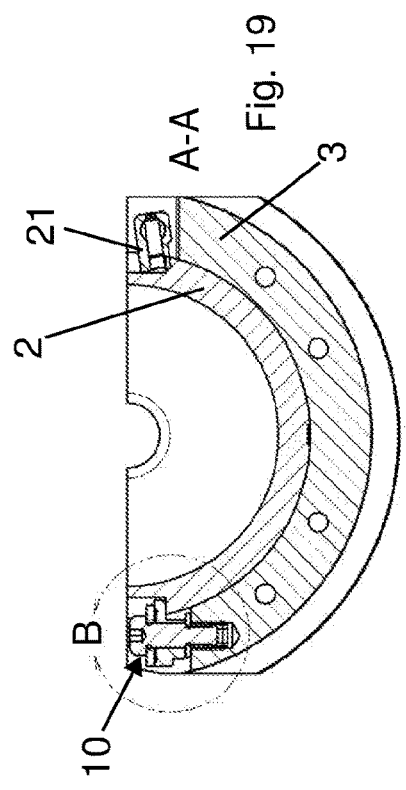
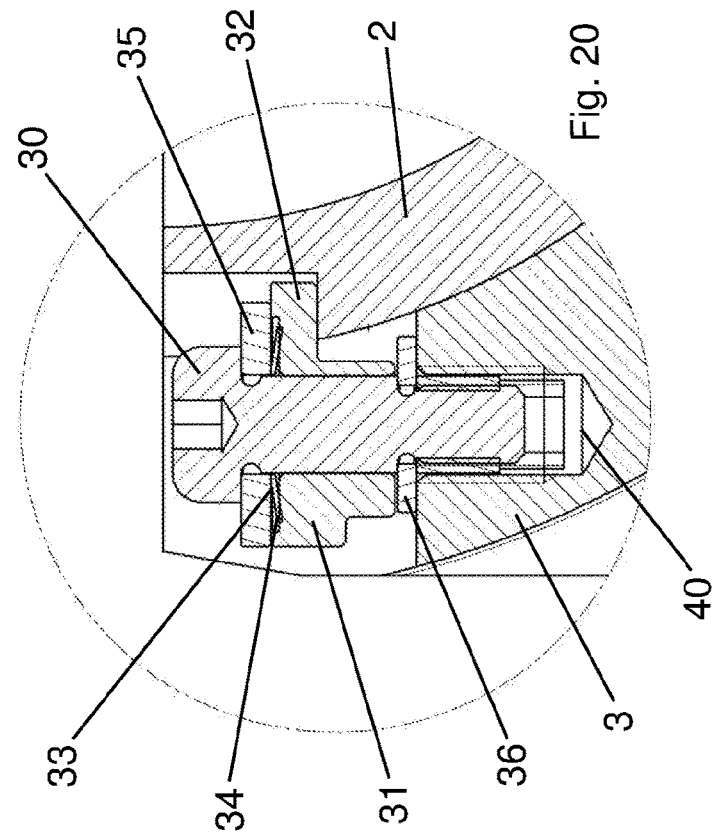
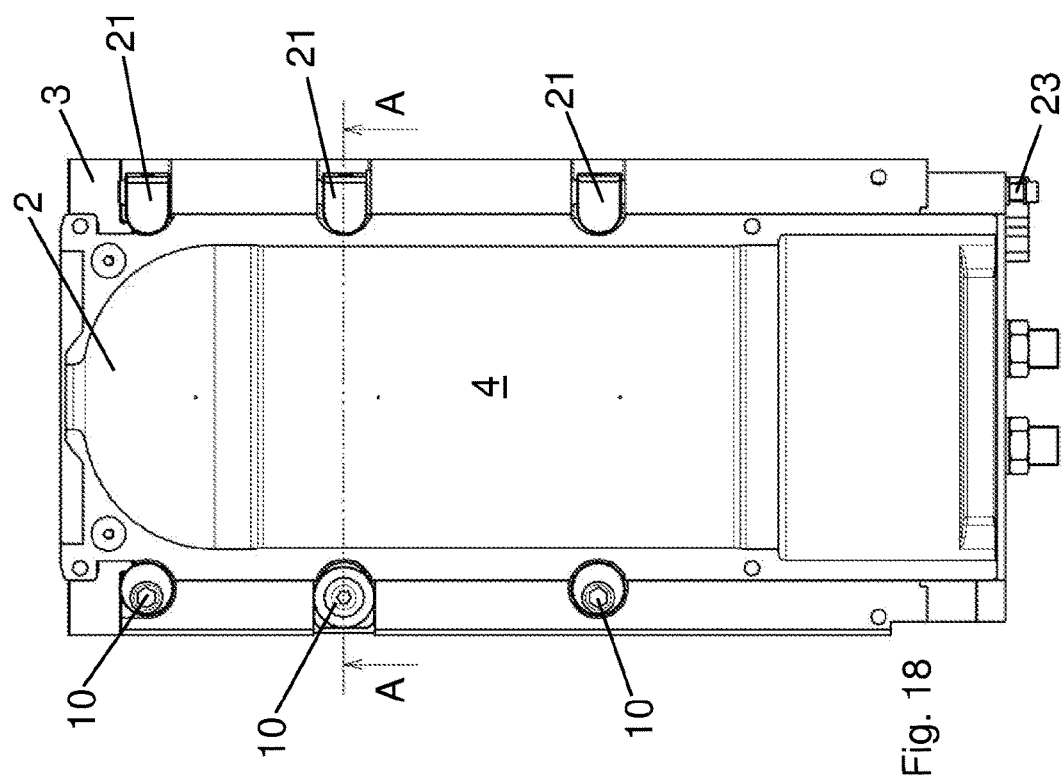

BLOW MOULD

CROSS REFERENCE TO RELATED APPLICATIONS

This application is a national phase of PCT application No. PCT/IB2017/050897, filed Feb. 17, 2017, which claims priority to IT patent application No. 102016000017532, filed Feb. 19, 2016, all of which are incorporated herein by reference thereto.

FIELD OF THE INVENTION

The present invention relates to a blow mold or stretch blow-mold of at least one preheated preform, made of thermoplastic material, for making containers; the mold being provided with a quick coupling system for fixing the half-impression of each side half-mold to the respective half-mold holder.

BACKGROUND ART

Generally, the two side half-molds of a blow mold for making thermoplastic material containers are removably fixed to the respective half-mold holders, whereby said half-molds may be replaced without the need to replace the whole blow device, in case of damage or wear and tear or especially in the event containers having different shapes and/or sizes are to be made.

In such a known solution, each half-mold is very heavy, e.g. about 20 kg for a steel mold. The fixing means are to be capable of supporting this weight and comprise many nut-screw joints and/or threaded joints. Moreover, each half-mold is provided with ducts for the circulation of one or more fluids for cooling and/or heating the walls of the half-impression obtained in the inner cavity of the half-mold. Such ducts are connected to fluid supply tubes with joints for the connection to the half-mold. Replacing each half-mold therefore also involves disconnecting and then reconnecting the respective tube joints.

All these aspects result in very long times for replacing the two half-impressions in a blow mold, which may reach about 10 minutes per mold.

A solution to this problem was obtained by the blow mold described in document EP0821641.

This blow mold consists of two side half-molds, each supported by a half-mold holder, the two half-mold holders being movable with respect to each other.

Although the quick coupling device used in this solution reduces the replacement times of the half-impressions to 5 minutes, it still does not completely meet the needs of the current market, especially for modern blow mold machines with a large number of molds. Moreover, a further disadvantage is the fact that there is still a need to use external tools to disassemble and assemble said half-impressions. Indeed, although so-called quick coupling devices are used, a predetermined number of screws is to be loosened to allow the locking tabs of the half-mold to be moved radially outwards, thus allowing the extraction thereof. Said predetermined number of screws then is to be tightened again once the half-impression is replaced, to allow the locking of the half-mold using the aforesaid tabs moved radially inwards of the mold in corresponding flat seats provided on the separation or contact surface of the half-mold.

Thus, the need is felt to make a blow mold provided with a quick coupling system of the side half-impressions which allows to overcome the aforesaid drawbacks.

SUMMARY OF THE INVENTION

It is the main object of the present invention to make a blow mold provided with a locking system for locking each half-mold to the related half-mold holder, thus allowing a simpler and quicker replacement of the side half-impressions of the mold.

It is another object of the invention to make a locking system which allows increased assurance of closing, fewer problems due to wear and tear and less stringent construction tolerance.

It is a further object of the invention to make a blow mold wherein the use of external tools for disassembling and assembling said half-impressions is no longer required due to the presence of a quick coupling device completely integrated in the half-mold holders.

Thus, the present invention proposes to achieve the objects discussed above by making a blow mold for plastic containers which, according to claim 1, defines a longitudinal axis and comprises:
- at least two half-molds,
- at least two half-mold holders, each half-mold holder carrying one of said half-molds, each half-mold holder and each half-mold defining respective complementary coupling surfaces between half-mold holder and half-mold,
- at least two quick coupling devices, each quick coupling device being adapted to lock a respective half-mold to the corresponding half-mold holder;
- wherein each quick coupling device is fixed to the respective half-mold holder and comprises
  - a bar, parallel to the longitudinal axis, inserted in one of the two longitudinal edges of the half-mold holder and adapted to move only by rotation about an axis thereof;
  - actuation means adapted to actuate a rotation of said bar about the axis thereof;
  - at least one locking fin fixed along said bar and adapted to move, through a rotation of the bar, from an unlocking position to a locking position in which said locking fin interacts with the respective half-mold, whereby the half-mold and respective half-mold holder are locked to each other in a position in which the respective complementary coupling surfaces are coupled to each other,
  - wherein there are provided elastic tensioning means for pretensioning said at least one locking fin.

In a particular embodiment, there are provided at least two locking fins, for example three or four locking fins. Fixed protruding members are provided in the other edge of the two longitudinal edges of the half-mold holder, on which members the half-mold abuts when it is inserted in the half-mold holder with an insertion and rotation movement. Advantageously, the number of fixed protruding members is equal to the number of locking fins, each fixed protruding member being arranged in a position corresponding to the one of a respective locking fin. The blow mold of the present invention comprises two side half-elements, each side half-element in turn comprising a half-mold carried by a half-mold holder. Advantageously, the blow mold of the invention provides for the half-impression of each side half-mold to be fixed with respect to the corresponding half-mold holder by actuating at least one quick coupling device. Such a quick coupling device may be provided even if the mold provides a bottom of the mold which is separate from the two side half-molds, in technical jargon called mold bottom, and comprising the impression of the bottom of the container to be blown.

Each quick coupling device comprises actuation means, in the form for example of a lever configured so as to rotate the bar provided with the locking fins from an unlocking position, in which the half-mold or a part thereof can be extracted from the half-mold holder, to a locking position, in which half-mold and half-mold holder are mutually integrally locked, or vice versa.

Advantageously, the quick coupling device is fixed in all components thereof to a wall of the half-mold holder and, in particular, the lever also remains fixed to the quick coupling device both in said unlocking position and in said locking position.

A pneumatically-operated device or device of other suitable type can be provided alternatively to the lever.

In a first advantageous embodiment, the bar inserted in one of the edges of the half-mold holder is a torsion bar which can rotate about the axis thereof to lock/unlock the half-mold by means of the fins or locking brackets coupled to said bar. These fins are slightly mutually offset about the torsion bar and therefore they are not mutually coplanar.

Therefore, this first solution uses the torsional flexibility of the bar, which acts as a pretensioning spring of the fins, and the non-coplanar fins to tighten the locking fins, thus avoiding clearances. The locking fins have an eccentric pressure zone with respect to the axis of the torsion bar. The torsion bar can rotate only about the axis thereof, therefore it does not translate vertically.

In a second advantageous embodiment, the torsion bar, which carries the brackets or the locking fins and causes them to pivot, is replaced by a bar with high torsional stiffness such as not to allow a deformation about the axis of the bar or in any case, such as to allow only a not significant deformation to tighten the locking fins, thus avoiding clearances. Advantageously, the pretensioning of the locking fins is ensured in this case by elastic means arranged on the other edge at the fixed protruding members on which the half-mold abuts. Therefore, said elastic means are arranged on the side opposite to the position of the support bar of the fins, with respect to the axis of the mold.

Thus, this second solution uses the elasticity of the protruding members to pretension the fins and tighten the locking fins, thus avoiding clearances. In this second embodiment, the locking fins can be mutually offset about the bar with high torsional stiffness or they can be mutually coplanar.

The dependent claims describe preferred embodiments of the invention.

BRIEF DESCRIPTION OF THE DRAWINGS

Further features and advantages of the invention will become more apparent in light of the detailed description of preferred, but not exclusive, embodiments of a blow mold, disclosed by way of a non-limiting example, with the aid of the enclosed drawings in which:

FIGS. 4a and 4b depict a perspective view and an exploded view, respectively, of a part of said quick coupling device;

FIGS. 5a, 5b and 5c respectively depict a side view, a top view and an enlargement of said top view of the part in FIG. 4a;

FIG. 6 depicts a front view of part of the blow mold in FIG. 1, in a first position;

FIG. 7 depicts a sectional view along the plane B-B of the part in FIG. 6;

FIG. 8 depicts an enlargement of part of FIG. 7;

FIG. 9 depicts a front view of the part in FIG. 6, in a second position;

FIG. 10 depicts a sectional view along the plane B-B of the part in FIG. 9;

FIG. 11 depicts an enlargement of part of FIG. 10;

FIG. 15 depicts a side view of a part of said second embodiment of the blow mold according to the invention, in a first position;

FIG. 16 depicts a sectional view along the plane A-A of the part in FIG. 15;

FIG. 17 depicts an enlargement of part of FIG. 16;

FIG. 18 depicts a side view of the part in FIG. 15, in a second position;

FIG. 19 depicts a sectional view along the plane A-A of the part in FIG. 18;

FIG. 20 depicts an enlargement of part of FIG. 19;

The same reference numerals in the drawings identify the same elements or components.

DETAILED DESCRIPTION OF PREFERRED EMBODIMENTS OF THE INVENTION

Figure 1:
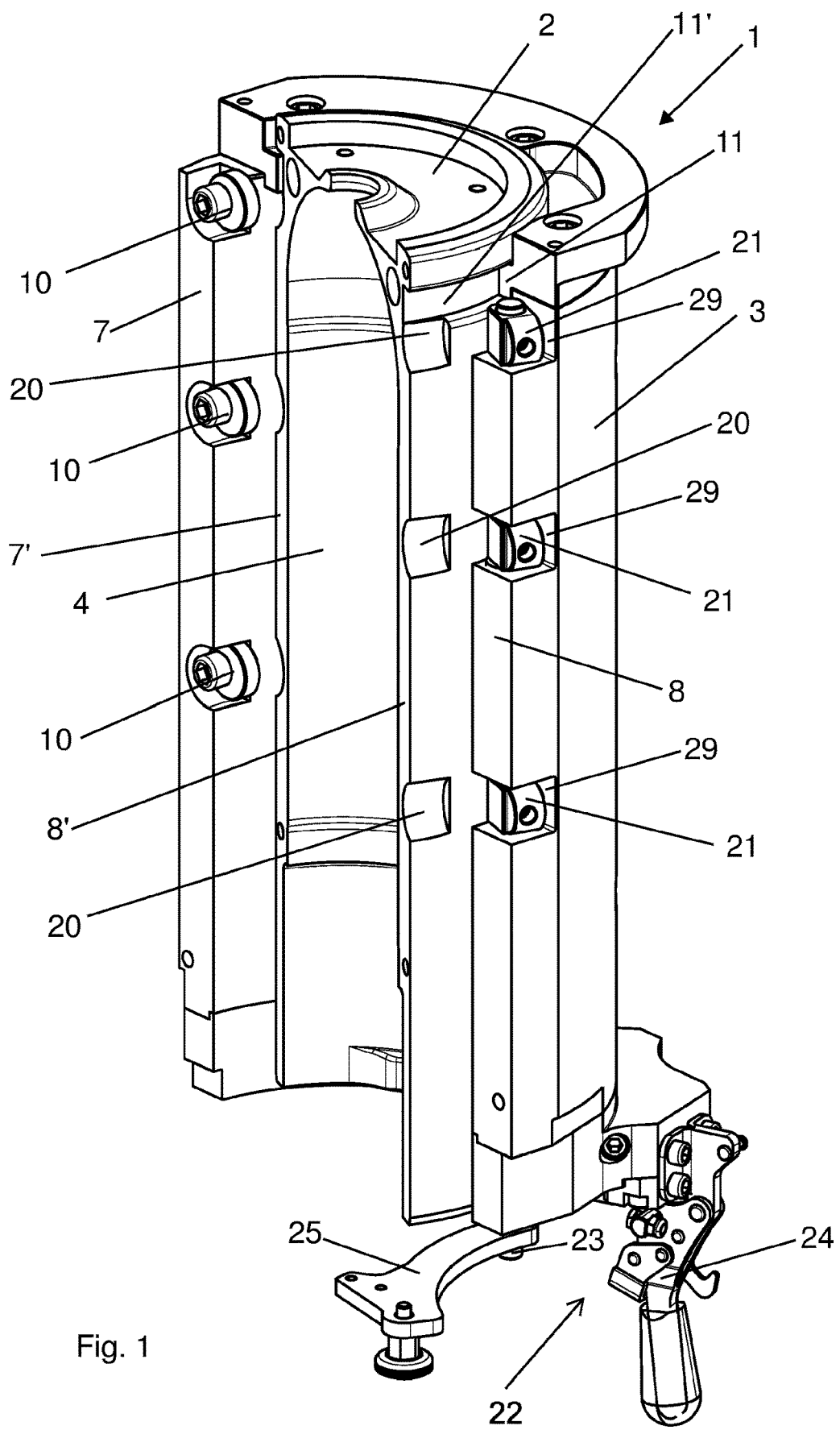
FIG. 1 depicts a perspective view of a part of a blow mold according to the invention.

With reference to the figures, part of a blow mold for making containers, in particular bottles, made of thermoplastic material such as PET, PEN or other suitable material, such as mixtures thereof, by blow molding or stretch blow-molding preheated preforms, is depicted.

The blow mold comprises two side half-elements 1, each side half-element 1 comprising a side half-mold 2 carried by a half-mold holder 3. The term half-mold comprises both a side half-mold made in a single piece, and a side half-mold comprising several pieces superimposed over one another in height. In this last case, the height of the containers to be molded may be varied or slightly different shaped containers can be obtained by changing only one piece of the half-mold. The blow mold of the present invention comprises two side half-molds 2, each supported by a respective half-mold holder 3, the two half-mold holders 3 being movable with respect to each other. The adjective "side" in this description, associated with the terms half-element, half-mold, half-mold holder and half-impression refers to a side or side portion of the container to be blown, with respect to the longitudinal axis of the container itself. The definition of side half-mold in this description is also used if a further element defining the bottom of the mold, called mold bottom in technical jargon, which is distinct from the two side half-molds, is provided in the mold. The bottom of the mold comprises the impression of the bottom of the container to be blown. Such an impression of the bottom of the container and the side half-impressions, provided in the half-molds, define the impression or overall profile of the container to be blown in the mold. Each half-mold holder 3 is provided with (FIGS. 2 and 14) an outer surface thereof and an inner surface thereof, the latter comprising the contact walls 7, 8 of the half-mold holder 3 and a substantially cylindrical inner wall 14 connecting said contact walls 7, 8.

Each side half-mold 2 (FIGS. 1, 6 and 9, 15 and 18) comprises a substantially cylindrical outer surface thereof (not shown) and an inner surface thereof comprising the contact walls 7', 8' of the half-mold 2 and an inner cavity defining the side half-impression 4 of the container to be molded.

Contact walls of a half-mold holder and related side half-mold mean those walls or inner edges which, once the blow mold is closed, adhere to the corresponding walls or inner edges of the opposed half-mold holder and related half-mold, thus defining a contact plane between the two side half-elements of the mold, thus leaving at least the empty zone corresponding to the inner volume of the container to be molded as a non-contact zone between said two half-elements.

The inner wall 14 of the half-mold holder 3 and the outer surface of the half-mold 2 substantially have a mutually complementary shape so as to at least partly come into contact with each other for purposes of heat conduction and mechanical connection. Therefore, said inner wall 14 of the half-mold holder 3 and said outer wall of the half-mold 2 define respective at least partly mutually complementary coupling surfaces between half-mold holder and half-mold.

The ducts for the circulation of the cooling and/or heating fluids for the half-impressions generally are provided in the half-mold holders 3. This allows the disconnection and subsequent reconnection to be avoided of the respective tube joints to which said ducts are connected, when there is a need to replace the half-molds.

However, in alternative variants, the ducts for the circulation of the cooling and/or heating fluids for the half-impressions can also or only be provided in the half-molds 2.

If, in the blow mold of the present invention, there is also provided a bottom of the mold, called mold bottom in technical jargon, which is separate from the two side half-molds 2, the ducts for the circulation of the cooling and/or heating fluids can also be provided in said mold bottom.

Advantageously, mutual axial positioning means of half-mold 2 and half-mold holder 3 are provided. In particular (FIG. 1), at least one half-ring projection 11 can be provided on the inner wall 14 of the half-mold holder 3 to which at least one respective half-ring recess 11' in the outer surface of the half-mold 2 corresponds, or vice versa, to facilitate the insertion of the half-mold in the half-mold holder through a rotary movement of said half-mold about a longitudinal axis thereof. In one variant (not shown), two half-ring projections and respective two half-ring recesses can be provided.

There are also provided, on the side opposite to the one on which the insertion of the half-mold into the half-mold holder begins, at least two fixed protruding members or abutting members 10 for correctly aligning the contact wall 7' of the half-mold 2 with the contact wall 7 of the half-mold holder 3. In the example in the drawings, there are provided three abutting members 10 fixed in recesses on the contact wall 7 of the half-mold holder 3. Such abutting members 10 protrude with a part thereof from the inner wall 14 towards the inside of the mold, thus acting as stroke end contact for the rotation of the half-mold 2.

If the half-mold holders are rotationally pivoted with respect to each other by means of a vertical pivot pin in order to form a "jackknife" or "book-type" mold, said at least two abutting members 10 are provided on each half-mold holder on the side of the pivot pin of the half-mold holders, while the quick coupling device is arranged on the opposite side.

Each side half-mold 2 is locked in a detachable manner with the respective half-mold holder 3 by means of at least one quick coupling device 5 (which is described in detail later), all the components of which are fixed to said half-mold holder 3.

Advantageously, the quick coupling device 5 comprises:
a bar or rod 23, parallel to the longitudinal axis X, inserted in one of the two longitudinal edges of the half-mold holder 3 and adapted to move only by rotation about an axis thereof;
actuation means 22 adapted to actuate the rotation of the bar 23 about the axis thereof;
at least one locking fin 21 fixed along said bar 23 and adapted to move, by rotating bar 23, from an unlocking position to a locking position in which the locking fin 21 interacts with the respective half-mold 2, whereby the half-mold and respective half-mold holder are locked to each other in a position in which the respective complementary coupling surfaces are coupled to each other.

The two longitudinal edges comprise the contact walls 7, 8 of the half-mold holder 3.

Preferably, there are provided at least two locking fins 21, fixed along bar 23. In the examples in the drawings, there are three locking fins, but there could also be more than three.

Advantageously, elastic pretensioning means are provided for pretensioning the locking fins 21.

In a first embodiment of the invention, shown in FIGS. from 2 to 13, the locking fins 21 are spaced apart from one another along the length of bar 23 and are arranged mutually angularly offset (FIG. 5c) so as to press onto the outer surface of the respective half-mold 2 in a different manner from one another.

With reference to FIGS. 4a, 4b, 5a, 5b, 5c, the three locking fins 21 define respective median surfaces which are not coplanar with one another.

Advantageously, the locking fins 21 are angularly offset with respect to one other and define angles which are mutually different, and selected in the range from 0 to 25°, with respect to a plane containing a contact wall 8 of the half-mold holder 3. Generally, this same plane also contains the other contact wall 7 of the same half-mold holder.

In an exemplifying variant, the upper locking fin defines a median surface which is inclined by a first angle comprised between 7 and 10°, e.g. 8.5°, with respect to the plane of the contact wall 8; the middle locking fin defines a median surface which is inclined by a second angle comprised between 5 and 8°, e.g. 6.5°, with respect to the aforesaid plane; the lower locking fin defines a median surface which is inclined by a third angle comprised between 3 and 6°, e.g. 4.5°, with respect to the aforesaid plane.

Fixed protruding members 10 are provided in the other longitudinal edge of the half-mold holder 3, i.e. the longitudinal edge comprising the contact wall 7, on which members the half-mold 2 abuts when it is inserted in the half-mold holder 3 with a rotation movement about the longitudinal axis X.

Preferably, each fixed protruding member 10, which protrudes inwards of the half-mold holder 3 with at least a part thereof, is arranged at the same height, along axis X, of a corresponding fixing fin 21.

In this first embodiment, each fixed protruding member 10 is for example, formed by a screw 30 fixed to a respective hole 40 provided in the body of the half-mold holder 3. A holed body 31 which protrudes inwards of the half-mold holder 3 acting as abutting element for the half-mold 2, is inserted on the shank of screw 30, between the head of the screw and hole 40. In particular, the holed body 31 is eccentric with respect to screw 30 and is provided with a hole 50 which is coaxial to the screw and is crossed by the screw shank. Preferably, each fixed protruding member 10 is accommodated in a corresponding recess 10' made in the contact wall 7.

FIGS. 6 to 8 show a position in which the half-mold 2 has not yet completed its rotation of insertion in the half-mold holder 3, while FIGS. 9 to 11 show the position in which the half-mold 2 has completed its rotation of insertion in the half-mold holder 3, with the half-mold 2 abutting on the part of the holed body 31 protruding inwards of the half-mold holder.

In this first embodiment of the invention, the elastic pretensioning means of the fixing fins 21 advantageously consist of the same bar 23 which has a torsional stiffness lower than 100 Nm/rad, where torsional stiffness means the ratio between the torsion momentum applied and the rotation angle. An optimal pretensioning behavior was observed with a bar 23 having a torsional stiffness from 30 to 70 Nm/rad, e.g. 55 Nm/rad.

Preferably, to increase the torsion capacity about the axis thereof, bar 23 has zones 26 having a smaller diameter than the zones 27 of the bars where the locking fins 21 are fixed. Zones 26 and zones 27 alternate along the longitudinal extension of bar 23. As shown in FIGS. 4a and 4b, the locking fins 21 are fixed to the zones 27 by respective pins 28 which cross holes provided in the corresponding fins 21 and zones 27 of the bar. Other suitable methods for fixing the fins 21 may however be provided. Bar 23 is inserted in the longitudinal edge of the half-mold holder comprising the contact wall 8. Recesses 29 (FIG. 1) are provided along said edge at the zones 27 of the bar where the locking fins 21 are fixed.

The distance between one locking fin 21 and the next one along bar 23 can be the same or different. In a second embodiment of the invention, shown in FIGS. from 14 to 22, said elastic pretensioning means of the fixing fins 21 are instead arranged at each of the fixed protruding members 10. In this second embodiment, bar 23 has a torsional stiffness which is at least equal to 200 Nm/rad such as not to allow a significant deformation of the bar about the axis thereof. In this case, bar 23 can also be made with a constant diameter. An optimal stiff behavior was observed with bars 23 having a torsional stiffness from 250 to 350 Nm/rad, e.g. about 300 Nm/rad. Also in this case, bar 23 is inserted in the longitudinal edge of the half-mold holder comprising the contact wall 8. Recesses 29 (FIG. 1) are provided along said edge at the zones of the bar where the locking fins 21 are fixed.

In this second embodiment, the locking fins 21 are spaced apart from one another along the length of bar 23 and are arranged mutually angularly offset, in an identical manner to the one described for the first embodiment, or they are arranged mutually coplanar, i.e. they define respective mutually coplanar median surfaces.

In a preferred but not exclusive variant, the elastic pretensioning means are integrated in the same fixed protruding members 10. In particular, said elastic pretensioning means are arranged inside fixed protruding members 10, for example in the form of Belleville washers.

Each fixed protruding member 10 is for example, formed by a screw 30 fixed to a respective hole 40 provided in the body of the half-mold holder 3. A holed body 31 provided with a projection 32, preferably a half-circle projection, is fixed on the shank of screw 30. Such a projection 32 protrudes inwards of the half-mold holder 3, acting as abutting element for the half-mold 2. As shown in FIGS. 14, 17 and 20 to 22, a washer 35 can be provided between the head of screw 30 and the holed body 31. A further washer 36 fixed to the shank of the screw, on the side opposite to washer 35 with respect to the holed body 31, delimits the end part of the shank which enters hole 40. Washer 36 is fixed on the shank of the screw at an annular groove 37 made on the latter. Preferably, each fixed protruding member 10 is accommodated in a corresponding recess 10' made in the contact wall 7.

In particular, the elastic pretensioning means, in the form e.g. of Belleville washers, are arranged between the head of screw 30 and the holed body 31. For example, as shown in FIGS. 17 and 20 to 22, at least one Belleville washer 33 is accommodated in a corresponding annular cavity 34 of the holed body 31 and is closed by washer 35, which is positioned between the head of screw 30 and the holed body 31. Thereby, when the half-mold 2 has not yet completed its rotation of insertion in the half-mold holder 3 (FIGS. 15 to 17), the Belleville washers 33 are extended inside the respective cavities 34. While, when the half-mold 2 has completed its rotation of insertion in the half-mold holder 3 (FIGS. 18 to 20), and that is the half-mold 2 has abutted on the respective projections 32, the Belleville washers 33 are compressed inside the respective cavities 34, thus causing the pretensioning of the locking fins 21 which press, on the opposite edge, on the inner surface of the half-mold 2 due to the rotation of bar 23.

Figure 2:
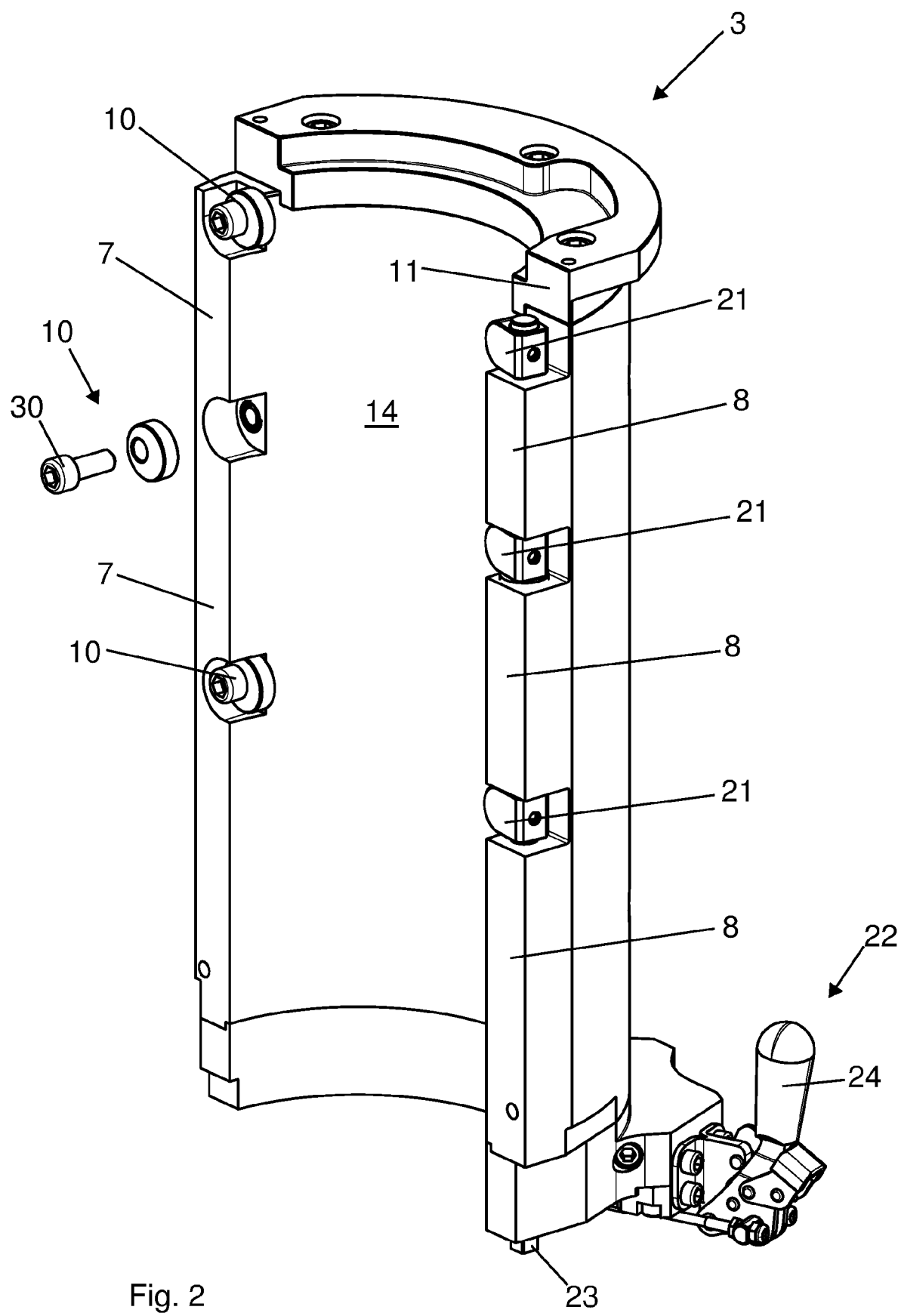
FIG. 2 depicts a perspective view of a half-mold holder of a first embodiment of the blow mold of the invention.
Figure 3:
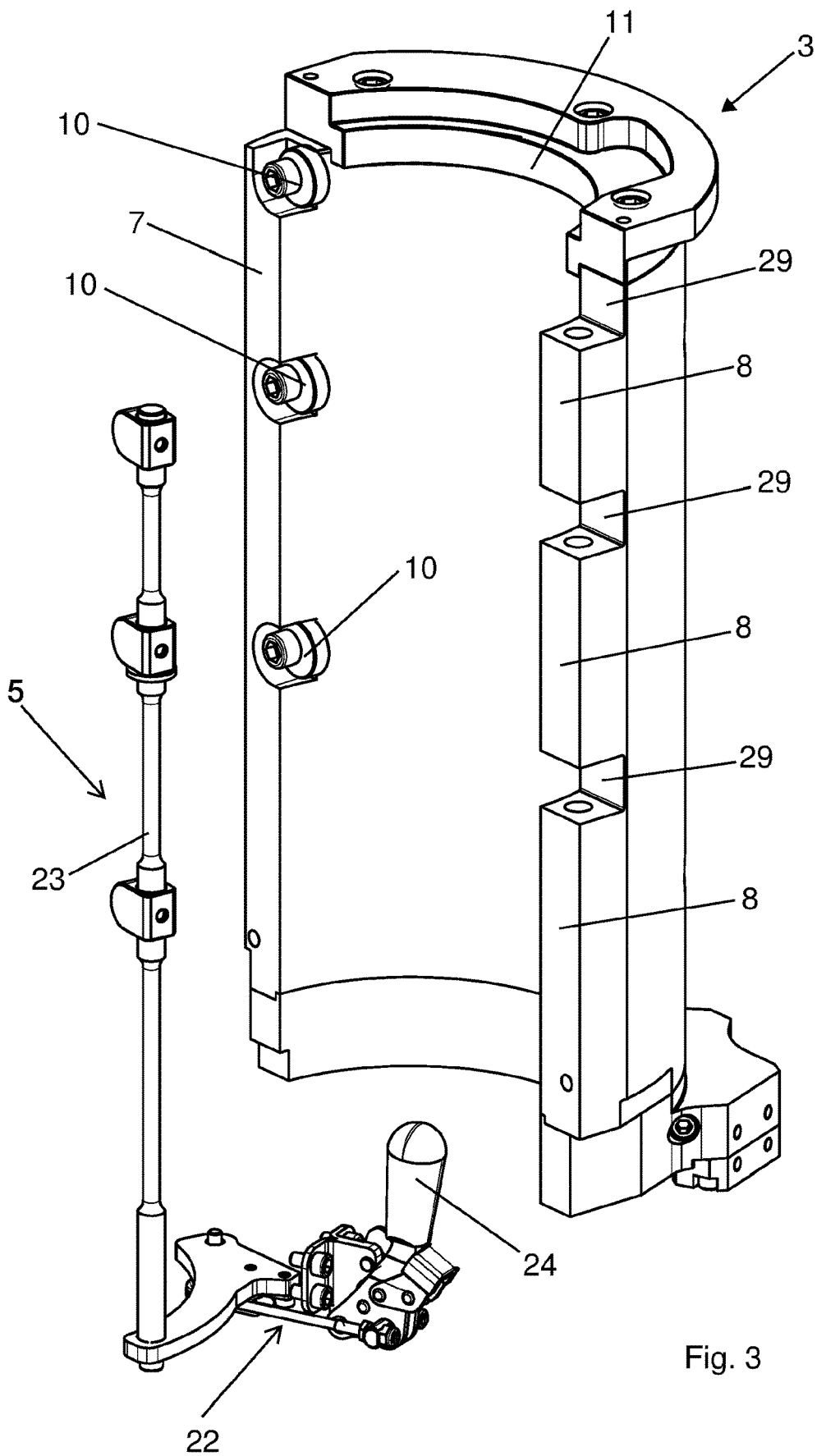
FIG. 3 depicts a view of the half-mold holder in FIG. 2, with the quick coupling device extracted.
Figure 12:
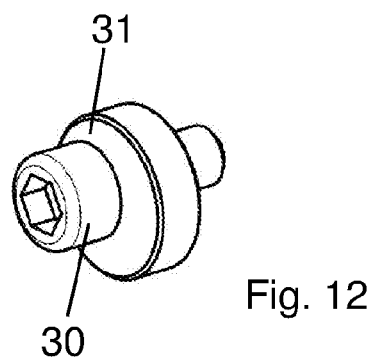
FIG. 12 depicts a perspective view of a component of the half-mold holder.
Figure 13:
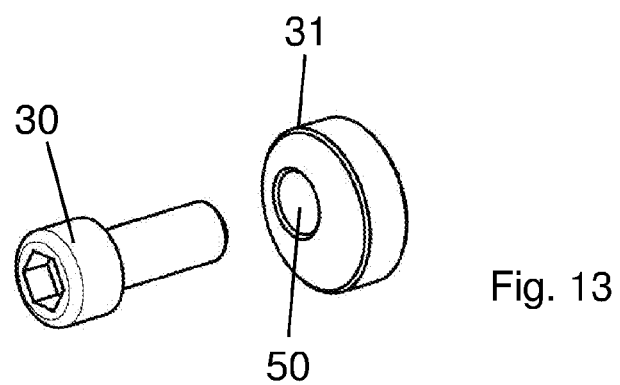
FIG. 13 depicts an exploded view of the component in FIG. 12.
Figure 14:
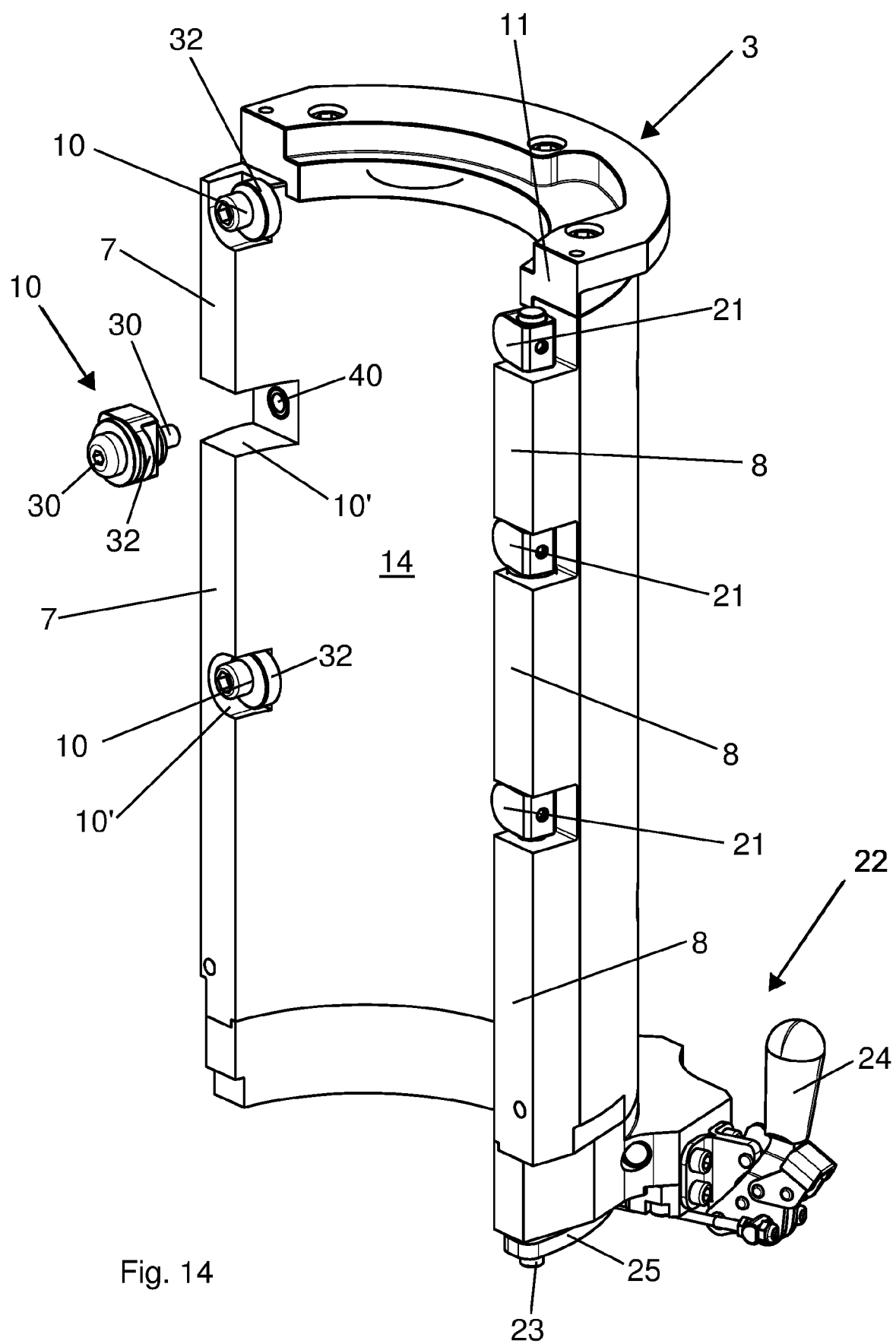
FIG. 14 depicts a perspective view of a half-mold holder of a second embodiment of the blow mold of the invention.
Figure 21:
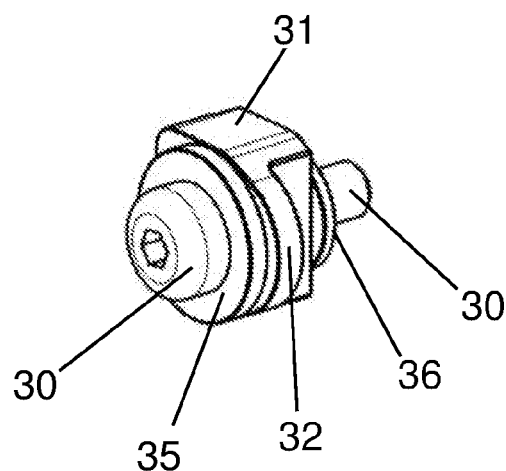
FIG. 21 depicts a perspective view of a component of the half-mold holder in FIG. 14.
Figure 22:
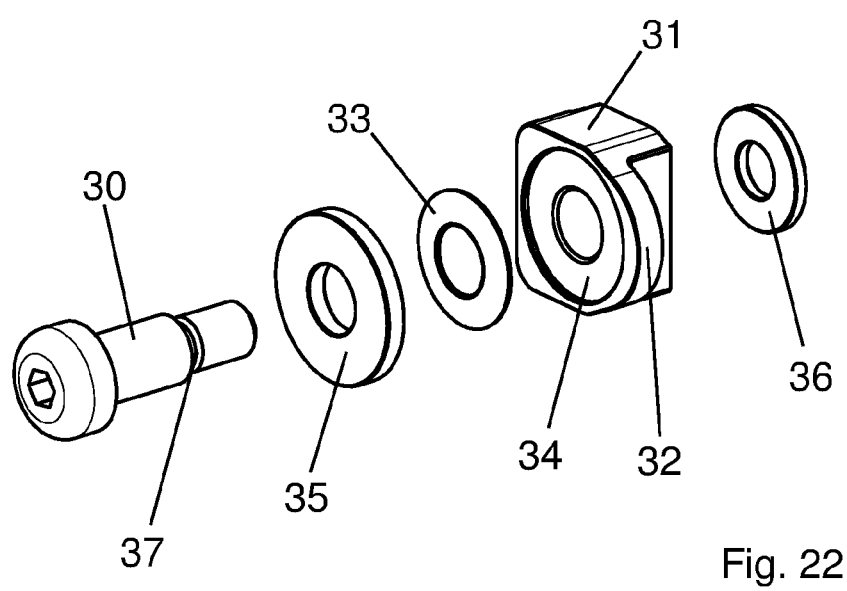
FIG. 22 depicts an exploded view of the component in FIG. 12.

In both embodiments of the invention, in order to lock the half-mold 2 to the half-mold holder 3, bar 23 is rotated about the axis thereof using the actuation means 22 once the protruding abutting members 10 are reached so that the conveniently pretensioned locking fins 21 interact with the coupling surface of the half-mold 2, whereby the respective half-mold and mold holder are effectively locked to each other also in the presence of some wear and tear and therefore, of some clearance between the components. If the locking fins 21 are angularly offset from one another, they press on the half-mold 2 in a different manner from one another. In a first variant, shown in the drawings, the actuation means 22 comprise a lever 24 which may be manually operated to switch from an unlocking position (FIG. 1) to a locking position (FIGS. 2 to 3 and 14). By actuating lever 24, rotary motion is transmitted to a movement bracket 25 which, given that it is integrally fixed to the lower end of bar 23, transmits it to bar 23 itself and to the fixing fins 21 which are integral with the latter. Once the locking position is reached, lever 24 is locked due, for example, to the insertion of a latch.

In a second variant, the actuation means comprise, instead, a pneumatic device (not shown) configured to transmit the rotary motion to the movement bracket 25 fixed at the lower end of bar 23.

In both variants, the half-mold and half-mold holder may be locked by fitting by providing recesses 20 obtained on the complementary coupling surface of the respective half-mold 2 (FIG. 1) for receiving the respective locking fins 21. Thereby, a locking with no clearances is ensured, and once the locking position is reached by the quick coupling device 5, the two side half-elements of the blow mold may be closed.

Advantageously, the quick coupling system of the blow mold of the present invention may be applied to blow molds both with vertical pivot pin of the half-mold holders ("jack-knife" mold) and with horizontal pivot pin of the half-mold holders. Moreover, it may also be applied to blow molds comprising two or more impressions of containers to be molded.

The invention claimed is:

1. A blow mold, defining a longitudinal axis, for plastic containers comprising
    at least two half-molds;
    at least two half-mold holders, each half-mold holder supporting one of said two half-molds, each half-mold holder and each half-mold defining respective complementary coupling surfaces between half-mold holder and half-mold;
    at least two quick coupling devices, each quick coupling device being adapted to lock a respective half-mold to a corresponding half-mold holder;
    wherein each quick coupling device is fixed to a respective half-mold holder and comprises
        a bar, parallel to the longitudinal axis, inserted in one of two longitudinal edges of the half-mold holder and adapted to move only by rotation about an axis thereof;
        a bracket fixed to the bar and coupled to an actuator, said bracket actuatable by the actuator so as to actuate a rotation of said bar about the axis thereof;
        at least one locking fin fixed along said bar and adapted to move, by actuation of the rotation of the bar, from an unlocking position to a locking position in which said at least one locking fin interacts with the respective half-mold, whereby the respective half-mold and the corresponding half-mold holder are locked to each other in a position in which the respective complementary coupling surfaces are coupled to each other,
    wherein there are provided elastic tensioning means for pretensioning said at least one locking fin.

2. The blow mold according to claim 1, wherein there are provided at least two locking fins, fixed along the bar and arranged mutually angularly offset, defining respective median, mutually non-coplanar surfaces so as to press onto a respective half-mold so as to exert a respective different pressure on the respective half mold.

3. The blow mold according to claim 2, wherein said locking fins are angularly offset with respect to each other defining angles which are mutually different with respect to a plane containing a contact wall of the half-mold holder; said contact wall at least partially defining a contact zone of the half-mold holder with the other half-mold holder when the mold is closed.

4. The blow mold according to claim 1, wherein in the other edge of the two longitudinal edges of the half-mold holder there is provided at least one fixed protruding member on which the respective half-mold abuts when it is inserted in the corresponding half-mold holder with a rotation movement about the longitudinal axis.

5. The blow mold according to claim 1, wherein said elastic tensioning means consists of said bar having a torsional stiffness lower than 100 Nm/rad.

6. The blow mold according to claim 1, wherein there are provided at least two locking pins, fixed along the bar and arranged either mutually angularly offset or mutually coplanar.

7. The blow mold according to claim 6, wherein said at least two locking fins are angularly offset with respect to each other and define angles which are mutually different with respect to a plane containing a contact wall of the half-mold holder; said contact wall at least partially defining a contact zone of the half-mold holder with the other half-mold holder when the mold is closed.

8. The blow mold according to claim 7, wherein said elastic tensioning means are arranged at at least one fixed protruding member, provided in the other edge of the two longitudinal edges of the half-mold holder and on which the respective half-mold abuts when said respective half-mold is inserted in the corresponding half-mold holder with a rotation movement about the longitudinal axis.

9. The blow mold according to claim 8, wherein said elastic tensioning means are integrated in said at least one fixed protruding member.

10. The blow mold according to claim 8, wherein there are provided two or more said fixed protruding members, each fixed protruding member being arranged in a position corresponding to that of a respective locking fin.

11. The blow mold according to claim 9, wherein said elastic tensioning means are Belleville washers.

12. The blow mold according to claim 6, wherein said bar has a torsional stiffness at least equal to 200 Nm/rad.

13. The blow mold according to claim 1, wherein there is provided at least one recess, obtained on the complementary coupling surface of the respective half-mold, to accommodate said at least one locking fin thus locking respective half-mold.

14. The blow mold according to claim 1, wherein said actuator comprise at least one lever, which can be manually operated, or comprise a pneumatic device.

* * * * *